US010089548B2

(12) United States Patent
Ando (10) Patent No.: US 10,089,548 B2
(45) Date of Patent: Oct. 2, 2018

(54) IMAGE RECOGNITION DEVICE AND IMAGE RECOGNITION METHOD (71) Applicant: OLYMPUS CORPORATION, Hachioji-shi, Tokyo (JP)

(72) Inventor: Jun Ando, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 100 days.

(21) Appl. No.: 15/258,343

(22) Filed: Sep. 7, 2016

(65) Prior Publication Data
US 2016/0379075 A1 Dec. 29, 2016

Related U.S. Application Data (63) Continuation of application No. PCT/JP2015/054022, filed on Feb. 13, 2015.

(30) Foreign Application Priority Data

Mar. 14, 2014 (JP) ................................ 2014-051579

(51) Int. Cl.
G06K 9/32 (2006.01)
G06K 9/62 (2006.01)
(Continued)

(52) U.S. Cl.
CPC ......... *G06K 9/3241* (2013.01); *G06K 9/4642* (2013.01); *G06K 9/6267* (2013.01);
(Continued)

(58) Field of Classification Search
CPC .. G06K 9/3241; G06K 9/6267; G06K 9/4642; H04N 5/345; H04N 5/343; H04N 5/347
(Continued)

(56) References Cited

U.S. PATENT DOCUMENTS

2001/0035982 A1 11/2001 Otsubo et al.
2008/0158365 A1* 7/2008 Reuter ................. G06K 9/20
348/207.1
(Continued)

FOREIGN PATENT DOCUMENTS

JP 09-282454 A 10/1997
JP 2001-313819 A 11/2001
(Continued)

OTHER PUBLICATIONS

International Search Report dated Apr. 14, 2015, issued in counterpart International Application No. PCT/JP2015/054022, w/English translation (2 pages).

*Primary Examiner* — Lin Ye
*Assistant Examiner* — Chan T Nguyen
(74) *Attorney, Agent, or Firm* — Westerman, Hattori, Daniels & Adrian, LLP (57) ABSTRACT An image recognition device includes: a plurality of first charge storage circuits that store signal charges generated by photoelectric conversion sections; a plurality of second charge storage circuits that store signal charges generated by the photoelectric conversion sections; a first charge read circuit section that reads a pixel signal and outputs an image as a first image; a second charge read circuit section that reads a pixel signal and outputs an image as a second image; a read circuit selection section that selects one of the first charge read circuit section and the second charge read circuit section; and a feature amount determination section, wherein the feature amount determination section determines a detection target subject according to a feature amount of a subject in the second image, and whether to perform the determination for a subject in the first image is determined based on the determination result.

7 Claims, 3 Drawing Sheets (51) Int. Cl.
*H04N 5/345* (2011.01)
*H04N 5/343* (2011.01)
*H04N 5/347* (2011.01)
*G06K 9/46* (2006.01)

(52) U.S. Cl.
CPC ............ *H04N 5/343* (2013.01); *H04N 5/345* (2013.01); *H04N 5/347* (2013.01)

(58) Field of Classification Search
USPC ........................................................ 348/308
See application file for complete search history.

(56) References Cited

U.S. PATENT DOCUMENTS

| | | | | |
|---|---|---|---|---|
| 2009/0080695 | A1* | 3/2009 | Yang | G06K 9/3241 382/103 |
| 2009/0238472 | A1 | 9/2009 | Fuchigami | |
| 2010/0128983 | A1* | 5/2010 | Sugai | G06K 9/3216 382/173 |
| 2011/0228139 | A1* | 9/2011 | Wajs | H04N 3/1562 348/239 |
| 2015/0169998 | A1* | 6/2015 | Rabinovich | G06K 9/6218 382/159 |

FOREIGN PATENT DOCUMENTS

| | | |
|---|---|---|
| JP | 2009-223893 A | 10/2009 |
| JP | 2010-223932 A | 10/2010 |

\* cited by examiner

IMAGE RECOGNITION DEVICE AND IMAGE RECOGNITION METHOD

This application is a continuation application based on a PCT International Application No. PCT/JP2015/054022, filed on Feb. 13, 2015, whose priority is claimed on Japanese Patent Application No. 2014-051579, filed Mar. 14, 2014. Both of the content of the PCT International Application and the Japanese Application are incorporated herein by reference.

BACKGROUND OF THE INVENTION

Field of the Invention

The present invention relates to an image recognition device and an image recognition method.

Description of Related Art

There is a known image recognition technique for recognizing an object reflected in an image, that is, a subject (object). In the image recognition, a more detailed feature amount is acquired by calculating the feature amount of the subject based on a high resolution image. Accordingly, a more complicated recognition is possible, but the processing speed is reduced. In contrast, if the feature amount of the subject is calculated based on a low resolution image in the image recognition, the processing speed is increased, but only a simple feature amount can be acquired. Accordingly, only simple recognition is possible.

Therefore, for example, as in Japanese Unexamined Patent Application, First Publication No. 2010-223932, a technique of dividing the process of image recognition into two stages so that both high-accuracy image recognition and high-speed image recognition are realized has been disclosed. The technique disclosed in Japanese Unexamined Patent Application, First Publication No. 2010-223932 is a technique of a defect detection method capable of detecting a defect accurately in a short time even in a case where a part to be examined is a part having a complicated shape or a part to be examined is a part with a plurality of kinds of defect. In the technique disclosed in Japanese Unexamined Patent Application, First Publication No. 2010-223932, a first feature amount that is an amount indicating the feature of a defect present on the surface of a part to be examined is calculated from an image captured by a camera, and it is examined whether or not a part as a defect candidate is present based on the first feature amount calculated herein.

In a case where an examination result indicating that a part as a defect candidate is present is obtained, a detailed image is further captured by moving the camera. In addition, a second feature amount is calculated from the image obtained by this further capturing, and it is quantified whether or not the part as a defect candidate is a genuine defect based on the second feature amount calculated herein.

Thus, by dividing the process of image recognition into two stages, performing simple image recognition processing using a low resolution image and a simple feature amount in the former process, and performing detailed image recognition processing using a high resolution image and a detailed feature amount in the latter process when the detailed image recognition processing is required, it is possible to realize both high-accuracy image recognition and high-speed image recognition.

SUMMARY OF THE INVENTION

According to a first aspect of the present invention, an image recognition device includes: a plurality of first charge storage circuits that store signal charges generated by photoelectric conversion sections provided in each of a plurality of pixels arranged in a two-dimensional matrix; a plurality of second charge storage circuits that store signal charges generated by the photoelectric conversion sections provided in predetermined pixels of the plurality of pixels; a first charge read circuit section that reads a pixel signal corresponding to the signal charge stored in each of the first charge storage circuits and outputs an image according to the read pixel signal as a first image; a second charge read circuit section that reads a pixel signal corresponding to the signal charge stored in each of the second charge storage circuits and outputs an image according to the read pixel signal as a second image having a predetermined reduced number of pixels; a read circuit selection section that selects one of the first charge read circuit section and the second charge read circuit section as a charge read circuit section that reads an image; an image reading section that reads an image from the charge read circuit section selected by the read circuit selection section; and a feature amount determination section that calculates a feature amount of a subject included in the image read by the image reading section and determines a detection target subject according to the calculated feature amount. The feature amount determination section determines the detection target subject according to a feature amount of each subject included in the second image read from the selected second charge read circuit section at first, and whether to select the first charge read circuit section and perform the determination for a subject included in the first image read from the selected first charge read circuit section is determined based on the determination result.

According to a second aspect of the present invention, in the image recognition device according to the first aspect described above, the second charge storage circuits may store signal charges corresponding to an amount of charges obtained by averaging the signal charges generated in the same exposure period by the photoelectric conversion sections in the plurality of corresponding pixels, and the second image output from the second charge read circuit section may be an image according to a pixel signal corresponding to the signal charges obtained by the same exposure as in the first image output from the first charge read circuit section, with a lower resolution than that of the first image.

According to a third aspect of the present invention, in the image recognition device according to the first or second aspect described above, a partial image setting section that sets partial images by dividing a region of the image read by the image reading section into at least one region may be further provided, and the feature amount determination section may determine whether or not a subject included in each of the partial images is the detection target subject for each of the partial images set by the partial image setting section.

According to a fourth aspect of the present invention, in the image recognition device according to the third aspect described above, the partial image setting section may set a plurality of partial images by dividing a region of the second image read first by the image reading section.

According to a fifth aspect of the present invention, in the image recognition device according to any one of the first to fourth aspects described above, an image range setting section that sets a range of the image read by the image reading section may be further provided. The image range setting section may set a range of the first image, which is to be read next by the image reading section, again according to a determination result regarding the detection target subject, which is obtained by determination of the feature amount determination section for the second image, and the image reading section may read the first image within the image range set again by the image range setting section when reading the first image next.

According to a sixth aspect of the present invention, in the image recognition device according to any one of the first to fifth aspects described above, the feature amount determination section may include a feature amount calculation section that calculates the feature amount of each subject included in the image read by the image reading section, a classifier applying section that inputs the feature amount calculated by the feature amount calculation section to a classifier prepared in advance and outputs a classification score indicating a detection target subject likeliness, and a detection determination section that determines whether or not a subject expressed by the feature amount calculated by the feature amount calculation section is the detection target subject according to the classification score calculated by the classifier applying section.

According to a seventh aspect of the present invention, in the image recognition device according to the sixth aspect described above, the feature amount calculation section may calculate the feature amount of each subject, which is included in the second image read first by the image reading section, and the feature amount of each subject, which is included in the first image read next by the image reading section, using different calculation methods, and the classifier applying section may input the feature amount calculated for the second image and the feature amount calculated for the first image to different classifiers prepared in advance.

According to an eighth aspect of the present invention, in the image recognition device according to any one of the fifth to seventh aspects citing the fifth aspect described above, when the image reading section reads the second image first, the image range setting section may set an entire range of the second image to be read as a range of the image read by the image reading section.

According to a ninth aspect of the present invention, an image recognition method includes: a first charge storage step of storing signal charges, which are generated by photoelectric conversion sections provided in a plurality of pixels arranged in a two-dimensional matrix, in a plurality of first charge storage circuits; a second charge storage step of storing the signal charges, which are generated by the photoelectric conversion sections provided in predetermined pixels of the plurality of pixels, in a plurality of second charge storage circuits; a first charge read step of causing a first charge read circuit section to read a pixel signal corresponding to the signal charge stored in each of the first charge storage circuits and output an image according to the read pixel signal as a first image; a second charge read step of causing a second charge read circuit section to read a pixel signal corresponding to the signal charge stored in each of the second charge storage circuits and output an image according to the read pixel signal as a second image having a predetermined reduced nmuber of pixels; a read circuit selection step of causing a read circuit selection section to select either the first charge read circuit section or the second charge read circuit section as a charge read circuit section that reads an image; an image reading step of causing an image reading section to read an image from the charge read circuit section selected in the read circuit selection step; and a feature amount determination step of causing a feature amount determination section to calculate a feature amount of each subject included in the image read in the image reading step and determine a detection target subject according to the calculated feature amount. Whether to select the first charge read circuit section in a second process and perform the determination for a subject included in the first image is determined by a determination result obtained by selecting the second charge read circuit section in a first process and determining the detection target subject according to a feature amount of each subject included in the second image read by the selected second charge read circuit section.

DETAILED DESCRIPTION OF THE INVENTION

Figure 1:
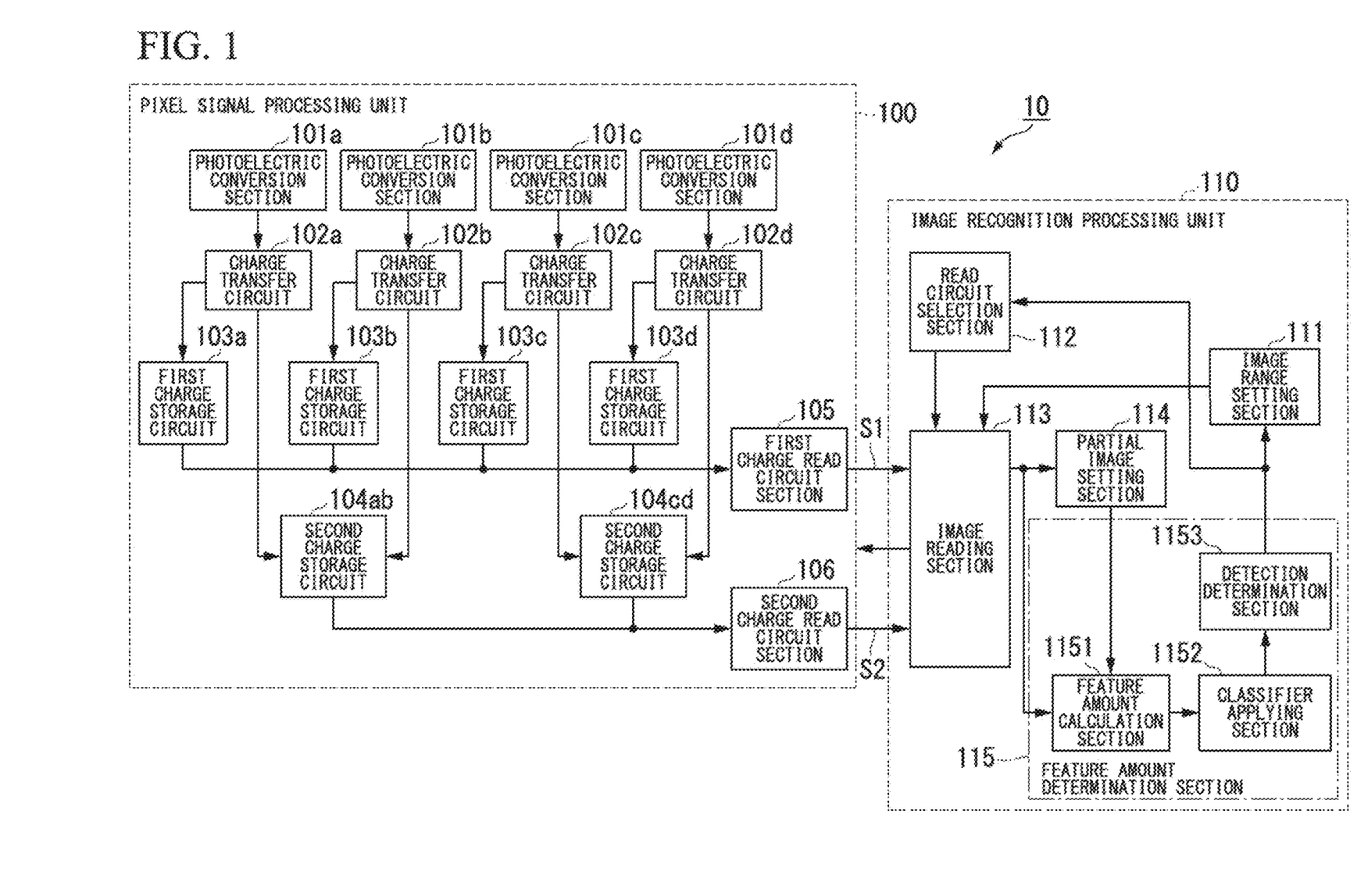
FIG. 1 is a block diagram showing the schematic configuration of an image recognition device in an embodiment of the present invention.

Hereinafter, embodiments of the present invention will be described with reference to the diagrams. FIG. 1 is a block diagram showing the schematic configuration of an image recognition device in the present embodiment. In FIG. 1, an image recognition device 10 is configured to include a pixel signal processing unit 100 and an image recognition processing unit 110.

The pixel signal processing unit 100 outputs a captured image to the image recognition processing unit 110 in response to an image read control signal input from the image recognition processing unit 110. The pixel signal processing unit 100 includes a pixel array in which a plurality of pixels are formed so as to be arranged in a two-dimensional matrix. The pixel signal processing unit 100 separately outputs a high resolution image S1, which is an image according to the pixel signals of all pixels arranged in the pixel array, and a low resolution image S2, which is an image according to the pixel signals of pixels obtained by reducing the number of pixels arranged in the pixel array.

The image recognition processing unit 110 performs image recognition processing by reading either the high resolution image S1 or the low resolution image S2 from the pixel signal processing unit 100 and calculating the feature amount of a subject included in the read image. At this time, the image recognition processing unit 110 performs simple image recognition processing first according to the low resolution image S2, and performs detailed image recognition processing according to the high resolution image S1 when the detailed image recognition processing is required.

Through the configuration described above, the image recognition device 10 divides the process of image recognition into two stages so that both high-accuracy image recognition and high-speed image recognition are realized. That is, in the first (former) process of image recognition, the image recognition device 10 performs high-speed image recognition using the low resolution image S2 whose reading can be completed more quickly than the high resolution image S1 for which the number of pixels has not been reduced. Then, in the next (latter) process of image recognition, the image recognition device 10 performs high-accuracy image recognition using the high resolution image S1 from which a more detailed subject feature amount can be calculated than from the low resolution image S2 for which the number of pixels has been reduced. Through the configuration described above, the image recognition device 10 realizes both high-accuracy image recognition and the high-speed image recognition.

Next, each component of the image recognition device 10 of the present embodiment will be described in more detail. First, the configuration of the pixel signal processing unit 100 in the image recognition device 10 of the present embodiment shown in FIG. 1 will be described in more detail. In the image recognition device 10, as described above, a pixel array in which a plurality of pixels are arranged in a two-dimensional matrix is included in the pixel signal processing unit 100. However, for simplicity of explanation, FIG. 1 shows an example of a case where four pixels of pixels a to d are arranged in the pixel signal processing unit 100 provided in the image recognition device 10. In addition, the pixel signal processing unit 100 also includes a component such as a vertical scanning circuit or a horizontal scanning circuit that is provided in an imaging system, in which the image recognition device 10 of the present embodiment is provided, and that drives a component of each pixel arranged in the pixel signal processing unit 100 according to the control of a control device that controls the image recognition device 10. However, the component is omitted in FIG. 1.

In the following explanation, in order to distinguish pixels corresponding to the respective components, that is, the pixels a to d, a reference numeral of "a", "b", "c", or "d" indicating the corresponding pixel will be attached to the end of the reference numeral of each component for explanation. More specifically, for the following explanation, "a" is given to the end of the reference numeral of a component corresponding to the pixel a, "b" is given to the end of the reference numeral of a component corresponding to the pixel b, "c" is given to the end of the reference numeral of a component corresponding to the pixel c, and "d" is given to the end of the reference numeral of a component corresponding to the pixel d. A component corresponding to a plurality of pixels, among the pixels a to d, will be described by giving a plurality of reference numerals ("a" to "d") to the end of the reference numeral of the component. A component corresponding commonly to the pixels a to d will be described without the reference numerals of "a" to "d" being attached thereto. In addition, in a case where pixels are not distinguished when describing a component even though the component is a component corresponding to one of the pixels a to d, explanation will be given with only the reference numeral of each component without showing the reference numerals of "a" to "d".

The pixel signal processing unit 100 of the image recognition device 10 of the present embodiment shown in FIG. 1 is configured to include four photoelectric conversion sections 101a to 101d, four charge transfer circuits 102a to 102d, four first charge storage circuits 103a to 103d, two second charge storage circuits 104ab and 104cd, a first charge read circuit section 105, and a second charge read circuit section 106. In the pixel signal processing unit 100 shown in FIG. 1, the pixel a is formed by the components of the photoelectric conversion section 101a, the charge transfer circuit 102a, and the first charge storage circuit 103a, and the pixel b is formed by the components of the photoelectric conversion section 101b, the charge transfer circuit 102b, and the first charge storage circuit 103b. In addition, in the pixel signal processing unit 100 shown in FIG. 1, the pixel c is formed by the components of the photoelectric conversion section 101c, the charge transfer circuit 102c, and the first charge storage circuit 103c, and the pixel d is formed by the components of the photoelectric conversion section 101d, the charge transfer circuit 102d, and the first charge storage circuit 103d. In the pixel signal processing unit 100 shown in FIG. 1, the second charge storage circuit 104ab is a component common to the pixels a and b, and the second charge storage circuit 104cd is a component common to the pixels c and d.

Each of the photoelectric conversion sections 101a to 101d is a photoelectric conversion section such as a photodiode that generates signal charges by performing photoelectric conversion of incident light and stores the generated signal charges.

The charge transfer circuits 102a to 102d transfer the signal charges, which are generated and stored in the corresponding photoelectric conversion sections 101a to 101d, to the corresponding first charge storage circuits 103a to 103d and the corresponding second charge storage circuit 104ab or 104cd. That is, the charge transfer circuit 102a transfers the signal charges, which are generated and stored in the corresponding photoelectric conversion section 101a, to the corresponding first charge storage circuit 103a and the corresponding second charge storage circuit 104ab. The charge transfer circuit 102b transfers the signal charges, which are generated and stored in the corresponding photoelectric conversion section 101b, to the corresponding first charge storage circuit 103b and the corresponding second charge storage circuit 104ab. The charge transfer circuit 102c transfers the signal charges, which are generated and stored in the corresponding photoelectric conversion section 101c, to the corresponding first charge storage circuit 103c and the corresponding second charge storage circuit 104cd. The charge transfer circuit 102d transfers the signal charges, which are generated and stored in the corresponding photoelectric conversion section 101d, to the corresponding first charge storage circuit 103d and the corresponding second charge storage circuit 104cd.

The first charge storage circuits 103a to 103d store (accumulate) signal charges that are generated by the corresponding photoelectric conversion sections 101a to 101d and are transferred from the corresponding charge transfer circuits 102a to 102d. Here, the signal charges stored (accumulated) in the first charge storage circuits 103a to 103d are signal charges of all pixels provided in the pixel signal processing unit 100, that is, signal charges used in the generation of a high resolution image. Each of the first charge storage circuits 103a to 103d outputs a signal voltage corresponding to the stored signal charge, as a pixel signal, to the first charge read circuit section 105 in response to a charge read control signal input from the first charge read circuit section 105.

The second charge storage circuits 104ab and 104cd are circuits that store (accumulate) signal charges corresponding to the amount of charges, which is obtained by averaging the amounts of signal charges that are generated by the corresponding photoelectric conversion sections 101a to 101d and are transferred from the corresponding charge transfer circuits 102a to 102d, or signal charges before averaging the amounts of signal charges (averaging charge storage circuits). That is, the second charge storage circuit 104ab is a circuit that stores (accumulates) signal charges corresponding to the amount of charges, which is obtained by averaging the amounts of signal charges that are generated by the corresponding photoelectric conversion sections 101a and 101b and are transferred from the corresponding charge transfer circuits 102a and 102b, or signal charges before averaging the amounts of signal charges (averaging charge storage circuits). The second charge storage circuit 104cd is a circuit that stores (accumulates) signal charges corresponding to the amount of charges, which is obtained by averaging the amounts of signal charges that are generated by the corresponding photoelectric conversion sections 101c and 101d and are transferred from the corresponding charge transfer circuits 102c and 102d, or signal charges before averaging the amounts of signal charges (averaging charge storage circuits). That is, each of the second charge storage circuits 104ab and 104cd stores signal charges in a state in which the number of pixels provided in the pixel signal processing unit 100 is reduced by averaging the signal charges of the respective pixels provided in the pixel signal processing unit 100. Here, the signal charges stored (accumulated) in the second charge storage circuits 104ab and 104cd are signal charges used in the generation of a low resolution image that are obtained by reducing the number of pixels provided in the pixel signal processing unit 100. In addition, each of the second charge storage circuits 104ab and 104cd outputs a signal voltage corresponding to the stored signal charge, as a pixel signal in a state in which the number of pixels has been reduced, to the second charge read circuit section 106 in response to a charge read control signal input from the second charge read circuit section 106.

In the pixel signal processing unit 100 shown in FIG. 1, the second charge storage circuit 104ab corresponds to the charge transfer circuits 102a and 102b, that is, the photoelectric conversion sections 101a and 101b. The second charge storage circuit 104cd corresponds to the charge transfer circuits 102c and 102d, that is, the photoelectric conversion sections 101c and 101d.

Examples of the configuration of averaging the signal charges of pixels in order to reduce the number of pixels include a configuration of performing the averaging when storing the signal charges generated by the photoelectric conversion sections 101a and 101b in the second charge storage circuit 104ab and a configuration of performing the averaging when outputting the signal voltage corresponding to each signal charge stored in the second charge storage circuit 104ab. As the configuration of averaging the signal charges of pixels in order to reduce the number of pixels, for example, a configuration of performing the averaging after outputting the signal voltage corresponding to each signal charge stored in the second charge storage circuit 104ab may also be used.

The first charge read circuit section 105 sequentially outputs a charge read control signal, which is for sequentially reading pixel signals from the first charge storage circuits 103a to 103d, to each of the first charge storage circuits 103a to 103d in response to the image read control signal input from the image recognition processing unit 110. Then, the first charge read circuit section 105 outputs an image according to the pixel signal read from each of the first charge storage circuits 103a to 103d, as the high resolution image S1, to the image recognition processing unit 110.

The second charge read circuit section 106 sequentially outputs a charge read control signal, which is for sequentially reading the pixel signal in which the number of pixels has been reduced from each of the second charge storage circuits 104ab and 104cd, to each of the second charge storage circuits 104ab and 104cd in response to the image read control signal input from the image recognition processing unit 110. Then, the second charge read circuit section 106 outputs an image according to the pixel signal read from each of the second charge storage circuits 104ab and 104cd, as the low resolution image S2, to the image recognition processing unit 110.

Each of the first charge read circuit section 105 and the second charge read circuit section 106 may have a function of performing processing, such as noise removal, on the read pixel signal, for example, a function of correlated double sampling (CDS) processing. Each of the first charge read circuit section 105 and the second charge read circuit section 106 may include an A/D conversion circuit that performs analog-to-digital conversion of each read pixel signal (analog signal), so that each value (digital value) indicating the magnitude of each pixel signal (analog signal) that has been analog-to-digital converted is output as the high resolution image S1 or the low resolution image S2.

In the case of a configuration in which each of the second charge storage circuits 104ab and 104cd in the pixel signal processing unit 100 outputs a signal voltage corresponding to the stored signal charge as it is without averaging the signal voltage, the second charge read circuit section 106 may average pixel signals (signal voltage) and then output the low resolution image S2 according to the averaged pixel signal to the image recognition processing unit 110. In this case, the second charge read circuit section 106 may average the pixel signals read from the second charge storage circuits 104ab and 104cd in a state of analog signals, or may average the pixel signals read from the second charge storage circuits 104ab and 104cd in a state of digital signals after performing analog-to-digital conversion of the pixel signals.

Through the configuration described above, the pixel signal processing unit 100 exposes the respective pixels in the same exposure period, and stores the signal charge generated by the photoelectric conversion section 101 in the first charge storage circuit 103 in each pixel and stores a signal charge obtained by averaging each signal charge (signal charge obtained by reducing the number of pixels) in the second charge storage circuit 104. That is, in the pixel signal processing unit 100, signal charges used in the generation of images having different resolutions of high resolution and low resolution are stored. More specifically, in the pixel signal processing unit 100, the signal charge generated by the photoelectric conversion section 101a is stored in the first charge storage circuit 103a, the signal charge generated by the photoelectric conversion section 101b is stored in the first charge storage circuit 103b, the signal charge generated by the photoelectric conversion section 101c is stored in the first charge storage circuit 103c, and the signal charge generated by the photoelectric conversion section 101d is stored in the first charge storage circuit 103d. In the pixel signal processing unit 100, a signal charge obtained by averaging the signal charge generated by the photoelectric conversion section 101a and the signal charge generated by the photoelectric conversion section 101b is stored in the second charge storage circuit 104ab, and a signal charge obtained by averaging the signal charge generated by the photoelectric conversion section 101c and the signal charge generated by the photoelectric conversion section 101d is stored in the second charge storage circuit 104cd.

Then, in the pixel signal processing unit 100, reading of each pixel signal, which corresponds to the signal charge stored in each first charge storage circuit 103, by the first charge read circuit section 105, and reading of each pixel signal, which corresponds to the signal charge stored in each second charge storage circuit 104, by the second charge read circuit section 106 are separately performed. Therefore, according to the signal charges obtained by the same one exposure, the pixel signal processing unit 100 separately outputs the high resolution image S1 according to the pixel signals of all pixels provided in the pixel signal processing unit 100, and the low resolution image S2 according to the pixel signals obtained by reducing the number of pixels provided in the pixel signal processing unit 100.

In the pixel signal processing unit 100 shown in FIG. 1, the configuration of the pixel signal processing unit 100 is shown which includes the second charge storage circuit 104 that stores a signal charge obtained by averaging the amounts of signal charges generated by the photoelectric conversion sections 101 provided in the respective pixels with predetermined two pixels as a set. However, in the pixel array which is actually provided in the pixel signal processing unit 100 and in which a plurality of pixels are arranged in a two-dimensional matrix, for example, a color filter of the Bayer array is attached, and the photoelectric conversion section 101 provided in each pixel generates a signal charge by photoelectrically converting the corresponding color of the attached color filter that is included in the incident light. Therefore, in the pixel signal processing unit 100 in the image recognition device 10 of the present embodiment, it is desirable to form a set of pixels so that the center of gravity of the color of the attached color filter is not shifted and the signal charges of different colors are not averaged.

In addition, in the pixel signal processing unit 100 shown in FIG. 1, a configuration is shown in which the second charge storage circuits 104ab and 104cd average the signal charges generated by the corresponding photoelectric conversion sections 101a to 101d to reduce the number of pixels. However, the method of reducing the number of pixels is not limited to the averaging shown in FIG. 1. For example, a configuration of reducing the number of pixels by thinning out pixels may also be used. In this case, in the pixel signal processing unit 100 shown in FIG. 1, a configuration can be considered in which the second charge storage circuits 104ab and 104cd store (accumulate) any one of the signal charges generated by the corresponding photoelectric conversion sections 101a to 101d to thin out pixels.

The configuration of the image recognition processing unit 110 in the image recognition device 10 of the present embodiment shown in FIG. 1 will be described in more detail. The image recognition processing unit 110 in the image recognition device 10 of the present embodiment shown in FIG. 1 is configured to include an image range setting section 111, a read circuit selection section 112, an image reading section 113, a partial image setting section 114, and a feature amount determination section 115.

The image range setting section 111 sets the range of the image (image range) to use in reading each image from the pixel signal processing unit 100 and in processing image recognition. In other words, the image range setting section 111 sets a range (region in an image), which is to be subjected to image recognition processing, for each image. At this time, the image range setting section 111 changes a range for image recognition processing, according to the result of image recognition processing input from the feature amount determination section 115. Then, the image range setting section 111 outputs range information indicating the set range for image recognition processing to the image reading section 113.

The read circuit selection section 112 selects either the first charge read circuit section 105 or the second charge read circuit section 106, as a charge read circuit section that reads an image used in the image recognition processing, according to each process of image recognition divided into two stages. At this time, the read circuit selection section 112 changes a charge read circuit section to be selected according to which stage of the process the current process is. Which stage of the process the current process is can be determined by referring to the result of image recognition processing input from the feature amount determination section 115. Then, the read circuit selection section 112 outputs an image read instruction, which is for reading an image from the selected charge read circuit section, to the image reading section 113. More specifically, in a case where the process of image recognition is image recognition processing in which the high resolution image S1 is used, the read circuit selection section 112 outputs an image read instruction, which is for reading the high resolution image S1 from the first charge read circuit section 105, to the image reading section 113. In addition, in a case where the process of image recognition is image recognition processing in which the low resolution image S2 is used, the read circuit selection section 112 outputs an image read instruction, which is for reading the low resolution image S2 from the second charge read circuit section 106, to the image reading section 113.

The read circuit selection section 112 can also change a charge read circuit section to be selected without referring to the result of image recognition processing input from the feature amount determination section 115. In this case, in the image recognition processing of the image recognition device 10, it is possible to consider a method in which a control device, which is provided in the imaging system in which the image recognition device 10 of the present embodiment is provided and which controls the image recognition device 10, changes a charge read circuit section to be selected according to the result of the image recognition processing of the feature amount determination section 115.

In response to the image read instruction input from the read circuit selection section 112, the image reading section 113 outputs an image read control signal, which is for reading an image from the selected charge read circuit section, to the pixel signal processing unit 100. At this time, the image reading section 113 outputs an image read control signal, which is for reading an image within a range expressed by the range information input from the image range setting section 111, to the pixel signal processing unit 100. More specifically, in a case where an image read instruction indicating the reading of the high resolution image S1 using the first charge read circuit section 105 is input from the read circuit selection section 112, the image reading section 113 outputs an image read control signal, which is for reading the high resolution image S1 within the range expressed by the range information input from the image range setting section 111, to the first charge read circuit section 105 in the pixel signal processing unit 100. In addition, in a case where an image read instruction indicating the reading of the low resolution image S2 using the second charge read circuit section 106 is input from the read circuit selection section 112, the image reading section 113 outputs an image read control signal, which is for reading the low resolution image S2 within the range expressed by the range information input from the image range setting section 111, to the second charge read circuit section 106 in the pixel signal processing unit 100.

Accordingly, either the high resolution image S1 or the low resolution image S2 within the range expressed by the range information, which is used for image recognition processing in each process of image recognition, is read from the pixel signal processing unit 100. Then, the image reading section 113 outputs the image within the range expressed by the read range information to the partial image setting section 114 and the feature amount determination section 115.

The partial image setting section 114 sets a partial image by dividing the region of the image input from the image reading section 113 into at least one region for which image recognition processing is to be performed. Then, the partial image setting section 114 outputs information indicating each set region for which image recognition processing is to be performed, as partial image information, to the feature amount determination section 115.

As a method in which the partial image setting section 114 divides the region of an input image, for example, a so-called block division method of dividing the region of an image into a plurality of regions (blocks) set in advance in the horizontal and vertical directions can be considered. However, in blocks, that is, partial images obtained by the block division, parts or all of adjacent blocks may overlap each other. As another method in which the partial image setting section 114 divides the region of an input image, for example, over-dividing the region of an image using a region division method, such as JSEG algorithm, and setting each region obtained by the division as a partial image can also be considered. Since a partial image can be set according to the information of the contour or color of an image by using the over-division method, a region of a subject, for whom image recognition processing is to be performed, and a background region in an input image can be divided more accurately. In addition, the method used when the partial image setting section 114 divides the input image into a plurality of regions (partial images), for which image recognition processing is to be performed, is not particularly defined. That is, it is possible to use a known technique of dividing the region of an image into a plurality of regions.

It is also possible to adopt a configuration in which the result of image recognition processing is input to the partial image setting section 114 from the feature amount determination section 115 and a partial image to be set is changed according to the result of image recognition processing. In addition, it is also possible to adopt a configuration in which the partial image setting section 114 is not provided in the image recognition device 10. In this case, in the image recognition processing of the image recognition device 10, the entire range of the input image is set to a region, for which image recognition processing is to be performed, without setting a partial image. However, it is also possible to adopt a configuration in which a control device, which is provided in the imaging system in which the image recognition device 10 of the present embodiment is provided and which controls the image recognition device 10, sets a partial image instead of the partial image setting section 114.

The feature amount determination section 115 performs image recognition processing for the image input from the image reading section 113 for each region expressed by the partial image information input from the partial image setting section 114, that is, for each partial image. Then, the feature amount determination section 115 outputs the result of image recognition processing in each partial image to the image range setting section 111 and the read circuit selection section 112. The feature amount determination section 115 includes a feature amount calculation section 1151, a classifier applying section 1152, and a detection determination section 1153.

For example, the result of image recognition processing performed by the feature amount determination section 115 can also be output to a control device that is provided in the imaging system in which the image recognition device 10 of the present embodiment is provided and that controls the imaging system according to the result of the image recognition of the image recognition device 10, an image processing unit that generates a final image according to the result of the image recognition of the image recognition device 10, or the like. Therefore, in the imaging system in which the image recognition device 10 of the present embodiment is provided, it is possible to realize various functions according to the result of the image recognition of the image recognition device 10, such as recording an image including a predetermined detection target subject.

The feature amount calculation section 1151 calculates the feature amount of a subject included in the image input from the image reading section 113. At this time, for each partial image set by the partial image setting section 114, the feature amount calculation section 1151 calculates the feature amount of a subject included in the partial image. Then, the feature amount calculation section 1151 outputs the feature amount calculated for each partial image to the classifier applying section 1152.

As a method in which the feature amount calculation section 1151 calculates the feature amount of a subject included in the input image, for example, a method using a histogram of oriented gradients (HOG) or the like can be considered. In addition, as another method in which the feature amount calculation section 1151 calculates the feature amount of a subject included in the input image, for example, a method using a bag of features (BoF) or the like can be considered. Thus, since the feature amount calculation section 1151 calculates a complicated feature amount, it is possible to perform more accurate image recognition in the image recognition device 10 of the present embodiment or in the imaging system in which the image recognition device 10 of the present embodiment is provided.

The method in which the feature amount calculation section 1151 calculates the feature amount of a subject included in the input image is not particularly defined. That is, it is possible to use a known technique of calculating the feature amount of a subject included in an image. However, in a case where the feature amount calculation section 1151 calculates the feature amount of a subject included in a partial image set for the low resolution image S2, that is, in the case of performing simple image recognition processing, it is desirable to reduce the processing load by setting the method of calculating the feature amount as a simple method or reducing the number of feature amounts to be calculated. Here, as a method in which the feature amount calculation section 1151 calculates a simple feature amount of a subject included in the input image, for example, it is possible to consider a method using a histogram (RGB histogram) having the number of pixels divided into color spaces as an element. Each of the pixels has a color corresponding to the divided range of each color space obtained by dividing pixels in a partial image into color spaces of red (R), green (G), and blue (B). In addition, as another method in which the feature amount calculation section 1151 calculates a simple feature amount of a subject included in the input image, for example, a method using statistics, such as a standard deviation or an average value of brightness that each pixel in a partial image has can be considered. Thus, since the feature amount calculation section 1151 calculates a simple feature amount, it is possible not only to reduce power consumption due to a reduction in the number of pixels of the low resolution image S2 but also to shorten the total processing time in the image recognition device 10 of the present embodiment or in the imaging system in which the image recognition device 10 of the present embodiment is provided.

The pixel signal processing unit 100 may also be configured to output an image, which is obtained by taking a difference between the high resolution image S1 and the low resolution image S2, at high speed. In this case, the feature amount calculation section 1151 can also calculate the complicated feature amount of a subject included in the input image, for example, using scale search of scale-invariant feature transform (SIFT).

The classifier applying section 1152 calculates a classification score indicating the detection target subject likeliness for the subject included in the image input from the image reading section 113. At this time, the classifier applying section 1152 applies (inputs) the feature amount of each partial image input from the feature amount calculation section 1151 to a classifier prepared in advance, and outputs a classification score calculated for each feature amount in each partial image to the detection determination section 1153.

As a classifier prepared in advance in the classifier applying section 1152, for example, a support vector machine (SVM) can be considered, and it is possible to consider a method of calculating a classification score indicating the detection target subject likeliness according to the similarity with training data by comparing the feature amount of the subject calculated by the feature amount calculation section 1151 with each piece of a large amount of data (so-called training data) indicating the feature of the subject prepared in advance. As another classifier prepared in advance in the classifier applying section 1152, for example, a supervised learning machine, such as Kernel discriminant analysis (KDA), can also be considered. In addition, as another classifier prepared in advance in the classifier applying section 1152, it is also possible to consider the use of a method of comparing the feature amount input from the feature amount calculation section 1151 with a predetermined feature amount threshold value.

The method in which the classifier applying section 1152 calculates a classification score indicating the detection target subject likeliness of the input feature amount is not particularly defined. That is, it is possible to use a known technique of classification according to the feature amount of a subject included in an image. However, in a case where the classifier applying section 1152 calculates a classification score indicating the detection target subject likeliness for the feature amount of a subject included in a partial image set for the low resolution image S2, that is, in the case of performing simple image recognition processing, it is desirable to reduce the processing load of the classifier by setting the processing of the classifier used to calculate a classification score as simple processing. Therefore, it is possible to shorten the total processing time in the image recognition device 10 of the present embodiment or the imaging system in which the image recognition device 10 of the present embodiment is provided.

The feature amount determination section 115 can also be configured to update the classifier used in the feature amount determination section 115 in a sequential manner. Specifically, new training data is created by judging success or failure of a determination result, which is output from the feature amount determination section 115, for the image input from the image reading section 113 from the outside, and the created new training data is added to a training data set prepared in advance. Then, a classifier is reconstructed according to the added training data set, and the reconstructed classifier is set in the classifier used in the feature amount determination section 115. In this manner, it is possible to update the image recognition according to the user's preference in a digital camera or the like using the image recognition device 10 of the present embodiment.

The detection determination section 1153 determines whether or not each partial image is a detection target according to the classification score of each partial image input from the classifier applying section 1152. Then, the detection determination section 1153 outputs the determination result to the image range setting section 111 and the read circuit selection section 112 as a result of image recognition processing in each partial image.

As a method in which the detection determination section 1153 determines whether or not each partial image is a detection target, for example, it is possible to consider a method of performing determination by comparing the classification score input from the classifier applying section 1152 with a predetermined classification score threshold value for determining a detection target. In this case, according to whether or not the classification score input from the classifier applying section 1152 is equal to or greater than the predetermined classification score threshold value, it is determined whether or not each partial image input from the classifier applying section 1152 is a predetermined detection target.

The determination result of the detection determination section 1153 is shared by components in the feature amount determination section 115, that is, the feature amount calculation section 1151, the classifier applying section 1152, and the detection determination section 1153. However, it is also possible to consider a method in which the determination result of the detection determination section 1153 is not shared by the components in the feature amount determination section 115 and a control device, which is provided in the imaging system in which the image recognition device 10 of the present embodiment is provided and which controls the image recognition device 10, controls each component in the feature amount determination section 115 according to the determination result of the detection determination section 1153.

Through the configuration described above, in the image recognition processing unit 110, either the high resolution image S1 or the low resolution image S2 used for image recognition processing in each process of image recognition is read from the pixel signal processing unit 100. Then, in the image recognition processing unit 110, image recognition processing is performed for either the high resolution image S or the low resolution image S2 read from the pixel signal processing unit 100. More specifically, first, the low resolution image S2 is read from the pixel signal processing unit 100, and simple image recognition processing is performed on the read low resolution image S2. Then, when detailed image recognition processing is required, the high resolution image S1 is read from the pixel signal processing unit 100, and detailed image recognition processing is performed on the read high resolution image S1.

Thus, in the image recognition device 10 of the present embodiment, the process of image recognition can be divided into two stages so that both high-accuracy image recognition and high-speed image recognition can be realized.

Figure 2:
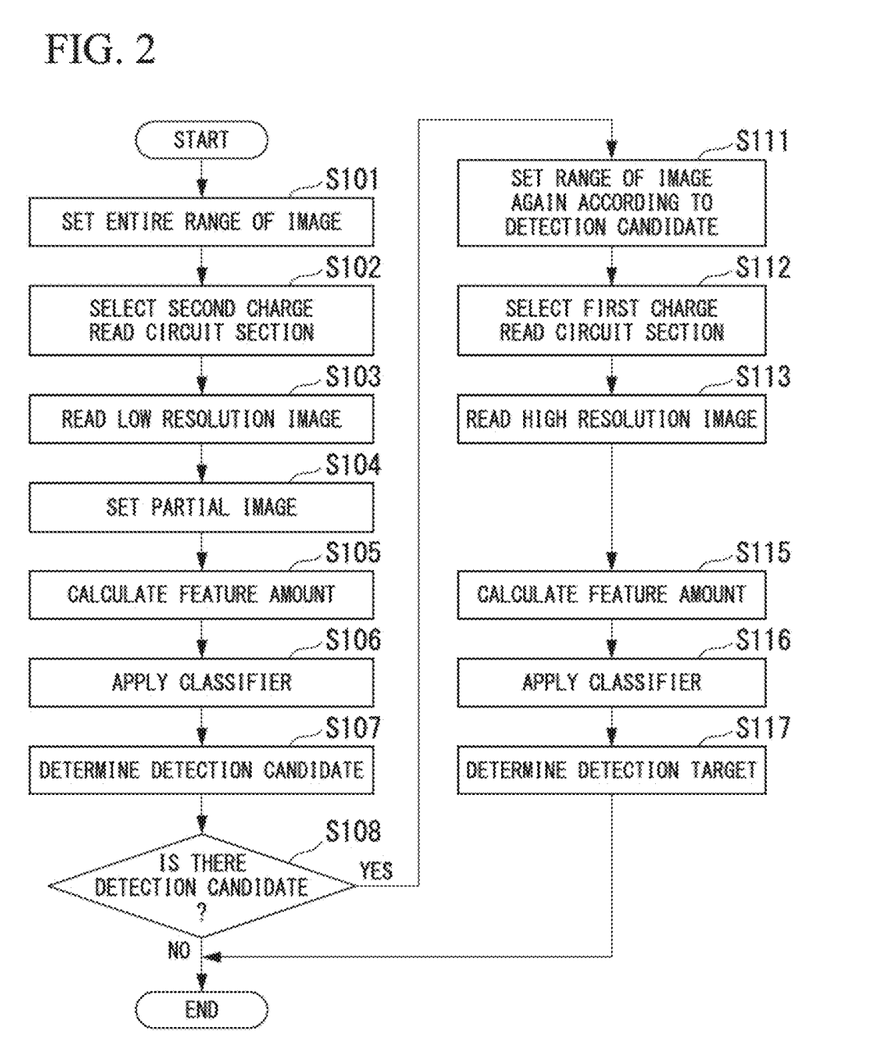
FIG. 2 is a flowchart showing the procedure of image recognition in the image recognition device of the present embodiment.
Figure 3:
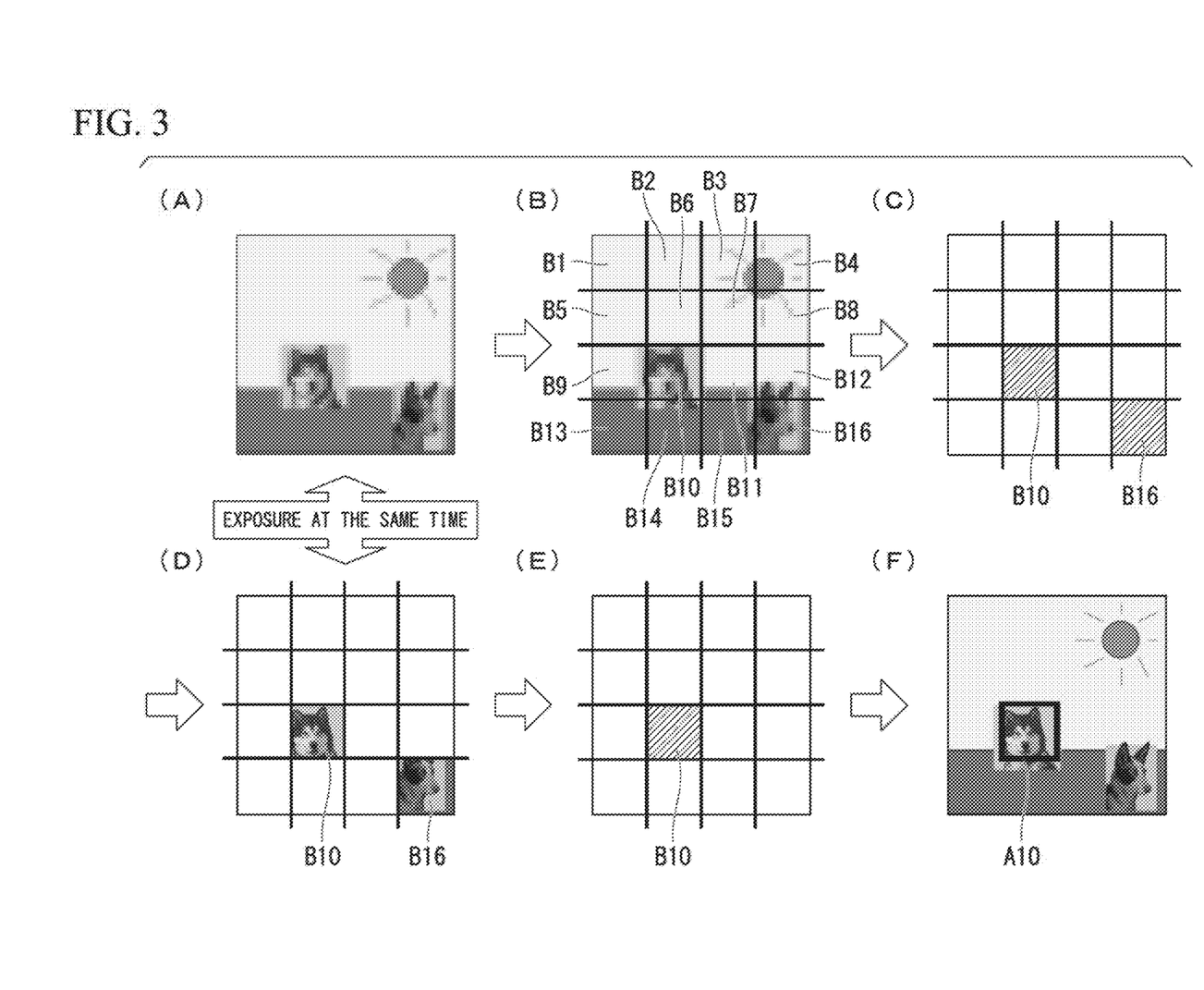
FIG. 3 is a diagram schematically showing an example of each step of image recognition processing in the image recognition device of the present embodiment.

Next, the procedure of image recognition processing in the image recognition device 10 of the present embodiment will be described. FIG. 2 is a flowchart showing the procedure of image recognition in the image recognition device 10 of the present embodiment. FIG. 3 is a diagram schematically showing an example of each step of image recognition processing in the image recognition device 10 of the present embodiment. In the explanation of the flowchart of the image recognition processing in the image recognition device 10 shown in FIG. 2, an example of a case where a "dog facing the front" is a detection target in an image, in which a "dog" is reflected as a subject, will be described by appropriately referring to an example of each step of the image recognition processing in the image recognition device 10 shown in FIG. 3.

In the image recognition processing of the image recognition device 10, as described above, the process of image recognition is performed in a state in which the process of image recognition is divided into two steps. More specifically, first, in the former process of image recognition (hereinafter, referred to as a "first image recognition process"), a subject that seems like a detection target (in this explanation, a "dog") is determined as a detection candidate. In the first image recognition process, since the low resolution image S2 with the reduced number of pixels is used, it is possible to perform image recognition processing at high speed. Therefore, for example, even in a case where an image update frequency (frame rate) is set to be high, it is possible to perform high-speed image recognition. Then, in the latter process of image recognition (hereinafter, referred to as a "second image recognition process"), a detection target subject to be finally detected is determined among detection candidates determined in the first image recognition process. In the second image recognition process, since the high resolution image S1 for which the number of pixels has not been reduced is used, it is possible to perform image recognition with higher accuracy than in the first image recognition process.

When the former process of image recognition ("first image recognition process") is started, first, in step S101, the image range setting section 111 sets an image range which is read from the pixel signal processing unit 100 and for which image recognition processing is to be performed. Since step S101 is a processing step of setting an image range for which image recognition processing is to be performed first in the first image recognition process, the result of image recognition processing is not input to the image range setting section 111 from the feature amount determination section 115. Accordingly, the image range setting section 111 sets the entire range of the image read from the pixel signal processing unit 100 as the image range for which image recognition processing is to be performed. Then, the image range setting section 111 outputs range information, which indicates that the entire range has been set as the image range, to the image reading section 113.

Then, in step S102, the read circuit selection section 112 selects a charge read circuit section that reads an image to be used in the image recognition processing. Since step S102 is a processing step of reading the first image for which image recognition processing is to be performed in the first image recognition process, the result of image recognition processing is not input to the read circuit selection section 112 from the feature amount determination section 115. Accordingly, the read circuit selection section 112 selects the second charge read circuit section 106 as a charge read circuit section that reads an image to be used in the image recognition processing. Then, the read circuit selection section 112 outputs an image read instruction, which is for reading an image from the selected second charge read circuit section 106, to the image reading section 113.

Then, in step S103, in response to the image read instruction input from the read circuit selection section 112, the image reading section 113 outputs an image read control signal, which is for reading the low resolution image S2 of the entire range expressed by the range information input from the image range setting section 111, to the second charge read circuit section 106 in the pixel signal processing unit 100. Thus, the low resolution image S2 of the entire range shown in picture (A) of FIG. 3 is output from the second charge read circuit section 106 in the pixel signal processing unit 100. Then, the image reading section 113 outputs the low resolution image S2 of the entire range, which has been read from the second charge read circuit section 106 in the pixel signal processing unit 100, to the partial image setting section 114 and the feature amount determination section 115.

Thus, in the first image recognition process, the low resolution image S2 obtained by reducing the number of pixels is read from the pixel signal processing unit 100. That is, in the first image recognition process, the low resolution image S2 is read at higher speed with lower power consumption than when reading the high resolution image S1 from the pixel signal processing unit 100. Therefore, in the first image recognition process, it is possible to realize high-speed image recognition processing.

Subsequently, in step S104, the partial image setting section 114 sets partial images by dividing the region of the low resolution image S2 of the entire range input from the image reading section 113. In an example of a partial image setting step in the first image recognition process shown in picture (B) of FIG. 3, a case in shown in which the region of the low resolution image S2 of the entire range is divided into a plurality of blocks set in advance (in picture (B) of FIG. 3, 16 blocks (4×4 blocks in the horizontal and vertical directions)) and the respective blocks are set as partial images B1 to B16. Then, the partial image setting section 114 outputs partial image information, which indicates each of the set partial images B1 to B16, to the feature amount calculation section 1151 in the feature amount determination section 115.

Then, in step S105, the feature amount calculation section 1151 calculates the feature amount of a subject, which is included in the low resolution image S2 of the entire range input from the image reading section 113, for each partial image expressed by the partial image information input from the partial image setting section 114. In addition, since step S105 is a processing step of performing processing for calculating the feature amount for each partial image set for the low resolution image S2, the feature amount calculation section 1151 calculates the feature amount of the subject using a simple method in which the above-described RGB histogram or statistics are used, for example. Then, the feature amount calculation section 1151 outputs the feature amount, which has been calculated for each partial image set for the low resolution image S2, to the classifier applying section 1152.

Then, in step S106, the classifier applying section 1152 inputs the feature amount of each partial image, which is set for the low resolution image S2 input from the feature amount calculation section 1151, to the classifier prepared in advance, and calculates a classification score indicating the detection target subject likeliness for each partial image. As a classifier to which each feature amount is input, for example, the above-described SVM can be considered. However, step S106 is a processing step of performing processing for applying a classifier to the feature amount of each partial image of the low resolution image S2. Therefore, the classifier applying section 1152 reduces the processing load of the classifier, for example, by reducing the number of feature amounts input from the feature amount calculation section 1151 or using a classifier, which is provided using a small amount of training data, so that the processing of the classifier becomes simple processing. In addition, in order to reduce the processing load of the classifier, it is also possible to use a classifier that uses a result of comparison between the feature amount of each partial image of the low resolution image S2 and a predetermined feature amount threshold value as a classification score. Then, the classifier applying section 1152 outputs each classification score calculated for each partial image to the detection determination section 1153.

Then, in step S107, the detection determination section 1153 determines whether or not each partial image is a detection candidate according to the classification score of each partial image set for the low resolution image S2 input from the classifier applying section 1152. Then, in step S108, the detection determination section 1153 determines which partial image is a detection candidate. That is, the detection determination section 1153 determines whether or not one or more partial images that are detection candidates are present.

As a result of the determination in step S108, in a case where one or more partial images that are detection candidates are not present, that is, in a case where any partial image set for the low resolution image S2 is not a detection candidate ("NO" in step S108), the first image recognition process is ended. Then, for example, image recognition processing for an image of the next frame is performed again from the first image recognition process.

On the other hand, as a result of the determination in step S108, in a case where one or more partial images that are detection candidates are present, that is, in a case where a partial image set for the low resolution image S2 is a detection candidate ("YES" in step S108), the detection determination section 1153 outputs a determination result for each partial image set for the low resolution image S2 to the image range setting section 111 and the read circuit selection section 112.

At this time, the detection determination section 1153 outputs information, which indicates which partial image is a detection candidate, to the image range setting section 111 and the read circuit selection section 112 in a state in which the information is included in the determination result. Picture (C) of FIG. 3 shows a case where the partial images B10 and B16, among the 16 partial images B1 to B16 obtained by block division, are detection candidates. Accordingly, the detection determination section 1153 outputs a determination result, which includes information indicating that the partial images B10 and B16 are detection candidates, to the image range setting section 111 and the read circuit selection section 112.

When the determination result indicating that one or more partial images that are detection candidates are present is input from the feature amount determination section 115, the image range setting section 111 starts the latter process of image recognition (second image recognition process) from step S111.

When the latter process of image recognition (second image recognition process) is started, first, in step S111, the image range setting section 111 sets a range of a partial image, which is a detection candidate, again as a new image range for which image recognition processing for new image input from the pixel signal processing unit 100 is to be performed. Since step S111 is a processing step of setting an image range for performing detailed image recognition processing in the second image recognition process, the image range setting section 111 sets the range of a partial image, which is a detection candidate included in the determination result input from the feature amount determination section 115, again as a new image range for which image recognition processing is to be performed. In picture (C) of FIG. 3, since the partial images B10 and B16 are detection candidates, the image range setting section 111 sets a range of each of the partial images B10 and B16 again as a new image range for which image recognition processing for new image input from the pixel signal processing unit 100 is to be performed. Then, the image range setting section 111 outputs range information, which indicates that the range of each partial image that is a detection candidate has been set again as a new image range, that is, the range of each of the partial images B10 and B16 has been set again as a new image range, to the image reading section 113.

Then, in step S112, the read circuit selection section 112 selects a charge read circuit section that reads an image to be used in the image recognition processing. Since step S112 is a processing step of reading an image for which detailed image recognition processing is to be performed in the second image recognition process, a determination result indicating that there is a partial image that is a detection candidate is input to the read circuit selection section 112 from the feature amount determination section 115. Accordingly, the read circuit selection section 112 selects the first charge read circuit section 105 as a charge read circuit section that reads an image to be used in the image recognition processing. Then, the read circuit selection section 112 outputs an image read instruction, which is for reading an image from the selected first charge read circuit section 105, to the image reading section 113.

Then, in step S113, in response to the image read instruction input from the read circuit selection section 112, the image reading section 113 outputs an image read control signal, which is for reading the high resolution image S1 within the range of each partial image that is a detection candidate expressed by range information input from the image range setting section 111, to the first charge read circuit section 105 in the pixel signal processing unit 100. Thus, the high resolution image S1 within the range of each of the partial images B10 and B16, which are detection candidates, shown in picture (D) of FIG. 3 is output from the first charge read circuit section 105 in the pixel signal processing unit 100. Then, the image reading section 113 outputs the high resolution image S1 within the range of each partial image, which is a detection candidate read from the first charge read circuit section 105 in the pixel signal processing unit 100, to the partial image setting section 114 and the feature amount determination section 115.

Thus, in the second image recognition process, the range of the high resolution image S1 read from the pixel signal processing unit 100 is limited. Therefore, in the second image recognition process, an increase in the reading speed and a reduction in power consumption are realized in the reading of the high resolution image S1 in which lower speed and higher power consumption than when reading the low resolution image S2 from the pixel signal processing unit 100 are expected. That is, in the second image recognition process, it is possible to perform high-accuracy image recognition processing while suppressing increases in the processing time and power consumption.

In the second image recognition process, only the region of the high resolution image S1 within the range of each partial image that is a detection candidate is read from the pixel signal processing unit 100. Therefore, in the second image recognition process, it is not necessary to set partial images by further dividing the region of the high resolution image S1 within the range of each partial image that is a detection candidate. For this reason, the partial image setting section 114 does not operate to output partial image information to the feature amount calculation section 1151 in the feature amount determination section 115. However, in the case of reading the high resolution image S1 from the pixel signal processing unit 100, the range of a row to read pixel signals from a plurality of pixels arranged in a pixel array provided in the pixel signal processing unit 100 can be controlled by the image read control signal output from the image reading section 113. However, it can also be considered that the range of a column cannot be controlled by the image read control signal. In this case, it can be considered that the image range setting section 111 reads the range, in which all partial images that are detection candidates are included, from the pixel signal processing unit 100 and sets the read range as a new image range, for which image recognition processing is to be performed, again in step S111. More specifically, it can be considered that the image range setting section 111 reads the range of the partial images B9 to B16, in which the partial images B10 and B16 that are detection candidates shown in picture (D) of FIG. 3 are included, from the pixel signal processing unit 100 and sets the read range as a new image range, for which image recognition processing is to be performed, again. Accordingly, in step S113, the image reading section 113 outputs an image read control signal for reading the high resolution image S1 within the range of the partial images B9 to B16, in which the partial images B10 and B16 that are detection candidates expressed by the range information input from the image range setting section 111 are included, to the first charge read circuit section 105 in the pixel signal processing unit 100. Then, the high resolution image S1 within the range of the partial images B9 to B16 is output from the first charge read circuit section 105 in the pixel signal processing unit 100. Therefore, in such a case, it can be considered that the partial image setting section 114 divides the region of the high resolution image S1 within the range of the partial images B9 to B16, in which the partial images B10 and B16 that are detection candidates input from the image reading section 113 are included, and outputs partial image information, which indicates that the region of only the partial image B10 or the partial image B16 that is a detection candidate has been set as a partial image, to the feature amount calculation section 1151 in the feature amount determination section 115.

Then, in step S115, the feature amount calculation section 1151 calculates the feature amount of a subject, which is included in the high resolution image S1 within the range of each partial image that is a detection candidate input from the image reading section 113, for each partial image. In addition, since step S115 is a processing step of performing processing for calculating the feature amount for each partial image for the high resolution image S1, the feature amount calculation section 1151 calculates the feature amount of the subject using a detailed method in which the above-described HOG or BoF is used, for example. Then, the feature amount calculation section 1151 outputs the feature amount, which has been calculated for each partial image for the high resolution image S1, to the classifier applying section 1152.

Then, in step S116, the classifier applying section 1152 inputs the feature amount of each partial image of the high resolution image S1, which has been input from the feature amount calculation section 1151, to the classifier prepared in advance, and calculates a classification score indicating the detection target subject likeliness for each partial image. In addition, since step S116 is a processing step of performing processing for applying the classifier to the feature amount of each partial image of the high resolution image S1, the classifier applying section 1152 calculates a more accurate classification score by using, for example, the above-described SVM or KDA as a classifier to which each feature amount is input. Then, the classifier applying section 1152 outputs each classification score, which has been calculated for each partial image for the high resolution image S1, to the detection determination section 1153.

Then, in step S117, the detection determination section 1153 determines whether or not each partial image is a detection target according to the classification score of each partial image of the high resolution image S1 input from the classifier applying section 1152, and ends the second image recognition process. That is, the detection determination section 1153 determines whether or not each partial image, which is a detection candidate detected in the first image recognition process, is a partial image as a detection target to be finally detected, and ends the second image recognition process. Picture (E) of FIG. 3 shows a case where the partial image B10 of the partial images B10 and B16, which are detection candidates shown in picture (D) of FIG. 3, is a detection target.

Here, the result of determination performed for each partial image of the high resolution image S1 by the detection determination section 1153, that is, a determination result including the information indicating that the partial image B10 is a detection target can be used by, for example, a control device that is provided in the imaging system in which the image recognition device 10 of the present embodiment is provided and that controls the imaging system according to the result of the image recognition of the image recognition device 10, an image processing unit that generates a final image according to the result of the image recognition of the image recognition device 10, or the like. Accordingly, in the imaging system in which the image recognition device 10 of the present embodiment is provided, it is possible to realize various functions according to the result of the image recognition of the image recognition device 10. For example, as shown in picture (F) of FIG. 3, a display frame A10 showing that a "dog facing the front" has been detected can be displayed so as to be superimposed on a display image that is generated according to the high resolution image S1 or the low resolution image S2 and that is displayed on a display device provided in the imaging system in which the image recognition device 10 of the present embodiment is provided.

According to the present embodiment, an image recognition device (image recognition device 10) is configured to include: a plurality of first charge storage circuits (first charge storage circuits 103a to 103d) that store signal charges generated by photoelectric conversion sections (photoelectric conversion sections 101a to 101d) provided in each of a plurality of pixels arranged in a two-dimensional matrix: a plurality of second charge storage circuits (second charge storage circuits 104ab and 104cd) that store the signal charges generated by the photoelectric conversion sections (photoelectric conversion sections 101a to 101d) provided in predetermined pixels of the plurality of pixels: a first charge read circuit section (first charge read circuit section 105) that reads a pixel signal corresponding to the signal charge stored in each of the first charge storage circuits 103a to 103d and outputs an image according to the read pixel signal as a first image (high resolution image S1); a second charge read circuit section (second charge read circuit section 106) that reads a pixel signal corresponding to the signal charge stored in each of the second charge storage circuits 104ab and 104cd and outputs an image according to the pixel signal read herein as a second image (low resolution image S2) having a predetermined reduced number of pixels; a read circuit selection section (read circuit selection section 112) that selects one of the first charge read circuit section 105 and the second charge read circuit section 106 as a charge read circuit section that reads an image; an image reading section (image reading section 113) that reads an image from the charge read circuit section selected by the read circuit selection section 112; and a feature amount determination section (feature amount determination section 115) that calculates a feature amount of a subject included in the image read by the image reading section 113 and determines a detection target subject according to the feature amount calculated herein. The feature amount determination section 115 determines the detection target subject according to a feature amount of each subject included in the second image read from the selected second charge read circuit section 106 at first, and whether to select the first charge read circuit section and perform the determination for a subject included in the first image read from the selected first charge read circuit section 105 is determined based on the determination result.

According to the present embodiment, the image recognition device 10 is configured such that the second charge storage circuits 104ab and 104cd store signal charges corresponding to an amount of charges obtained by averaging the signal charges generated in the same exposure period by the photoelectric conversion sections (photoelectric conversion sections 101a to 101d) in the plurality of corresponding pixels and the low resolution image S2 output from the second charge read circuit section 106 is an image according to a pixel signal corresponding to the signal charges obtained by the same exposure as in the high resolution image S1 output from the first charge read circuit section 105, with a lower resolution than that of the high resolution image S1.

According to the present embodiment, the image recognition device 10 is configured to further include a partial image setting section (partial image setting section 114) that sets partial images (for example, partial images B1 to B16) by dividing a region of the image read by the image reading section 113 into at least one region and configured such that the feature amount determination section 115 determines whether or not a subject included in each of the partial images is the detection target subject for each of the partial images (for example, partial images B1 to B16) set by the partial image setting section 114.

According to the present embodiment, the image recognition device 10 is configured such that the partial image setting section 114 sets a plurality of partial images (for example, partial images B1 to B16) by dividing a region of the low resolution image S2 read first by the image reading section 113.

According to the present embodiment, the image recognition device 10 is configured to further include an image range setting section (image range setting section 111) that sets a range of the image read by the image reading section 113 and configured such that the image range setting section 111 sets a range of the high resolution image S1, which is to be read next by the image reading section 113, again according to a determination result regarding the detection target subject, which is obtained by determination of the feature amount determination section 115 for the low resolution image S2, and the image reading section 113 reads the high resolution image S1 within the image range set again by the image range setting section 111 when reading the high resolution image S1 next.

According to the present embodiment, the image recognition device 10 is configured such that the feature amount determination section 115 includes a feature amount calculation section (feature amount calculation section 1151) that calculates the feature amount of each subject included in the image read by the image reading section 113, a classifier applying section (classifier applying section 1152) that inputs the feature amount calculated by the feature amount calculation section 1151 to a classifier prepared in advance and outputs a classification score indicating a detection target subject likeliness, and a detection determination section (detection determination section 1153) that determines whether or not a subject expressed by the feature amount calculated by the feature amount calculation section 1151 is the detection target subject according to the classification score calculated by the classifier applying section 1152.

According to the present embodiment, the image recognition device 10 is configured such that the feature amount calculation section 1151 calculates the feature amount of each subject, which is included in the low resolution image S2 read first by the image reading section 113, and the feature amount of each subject, which is included in the high resolution image S1 read next by the image reading section 113, using different calculation methods (for example, a simple method using an RGB histogram or statistics and a detailed method using HOG or BoF) and the classifier applying section 1152 inputs the feature amount calculated for the low resolution image S2 and the feature amount calculated for the high resolution image S1 to different classifiers (for example, a classifier that compares a feature amount with a threshold value and a classifier, such as SVM or KDA) prepared in advance.

According to the present embodiment, the image recognition device 10 is configured such that the image range setting section 111 sets an entire range of the low resolution image S2 to be read as a range of the image read by the image reading section 113 when the image reading section 113 reads the low resolution image S2 first.

According to the present embodiment, an image recognition method includes: a first charge storage step of storing signal charges, which are generated by photoelectric conversion sections (photoelectric conversion sections 101a to 101d) provided in a plurality of pixels arranged in a two-dimensional matrix, in a plurality of first charge storage circuits (first charge storage circuits 103a to 103d): a second charge storage step of storing the signal charges, which are generated by the photoelectric conversion sections (photoelectric conversion sections 101a to 101d) provided in predetermined pixels of the plurality of pixels, in a plurality of second charge storage circuits (second charge storage circuits 104ab and 104cd); a first charge read step of causing a first charge read circuit section (first charge read circuit section 105) to read a pixel signal corresponding to the signal charge stored in each of the first charge storage circuits (first charge storage circuits 103a to 103d) and output an image according to the pixel signal read herein as a first image (high resolution image S1); a second charge read step of causing a second charge read circuit section (second charge read circuit section 106) to read a pixel signal corresponding to the signal charge stored in each of the second charge storage circuits 104ab and 104cd and output an image according to the pixel signal read herein as a second image (low resolution image S2) having a predetermined reduced number of pixels; a read circuit selection step of causing a read circuit selection section (read circuit selection section 112) to select either the first charge read circuit section 105 or the second charge read circuit section 106 as a charge read circuit section that reads an image; an image reading step of causing an image reading section (image reading section 113) to read an image from the charge read circuit section selected in the read circuit selection step; and a feature amount determination step of causing a feature amount determination section (feature amount determination section 115) to calculate a feature amount of each subject included in the image read in the image reading step and determine a detection target subject according to the feature amount calculated herein. Whether to select the first charge read circuit section 105 in a second process (second image recognition processing) and perform the determination for a subject included in the high resolution image S1 is determined by a determination result obtained by selecting the second charge read circuit section 106 in a first process (first image recognition processing) and determining the detection target subject according to a feature amount of each subject included in the second image read by the second charge read circuit section 106 selected herein.

As described above, according to the above embodiment for carrying out the present invention, according to the signal charges obtained by the same exposure, a high resolution image according to the pixel signals of all pixels arranged in the pixel signal processing unit and a low resolution image according to the pixel signals obtained by reducing the number of the pixels arranged in the pixel signal processing unit are output separately and independently. In addition, according to the embodiment described above, the image recognition processing unit reads a low resolution image first from the pixel signal processing unit and performs simple image recognition processing, and reads a high resolution image from the pixel signal processing unit and performs detailed image recognition processing when detailed image recognition processing is required. Therefore, in the embodiment described above, it is possible to realize an image recognition device in which both high-accuracy image recognition and high-speed image recognition are realized.

According to the embodiment described above, the image recognition processing is performed using the high resolution image and the low resolution image that are obtained by the same one exposure (imaging) performed by the pixel signal processing unit. At this time, in the embodiment described above, a low resolution image is generated in the pixel signal processing unit. That is, the second charge storage circuit (averaging charge storage circuit) provided in the pixel signal processing unit generates the low resolution image by averaging the signal charges generated by the photoelectric conversion sections. Accordingly, it is possible to generate a low resolution image instantaneously. For this reason, in the embodiment described above, image processing for converting the resolution of an image, which has been required in the case of dividing the process of image recognition into two stages since imaging is performed only once in the conventional image recognition processing, is not required. Therefore, it is possible to realize an image recognition device capable of reducing the processing time required for the image recognition processing and power consumption during the processing. In addition, in the embodiment described above, since the image processing for converting the resolution of an image is not required, it is possible to realize a miniaturized image recognition device.

According to the embodiment described above, the image recognition processing is performed using the high resolution image and the low resolution image that are obtained by the same one exposure (imaging) performed by the pixel signal processing unit. Therefore, in high-speed simple image recognition processing using the low resolution image performed first and detailed image recognition processing using the high resolution image performed next, it is possible to perform image recognition processing for a subject captured at the same timing, that is, a subject with no position shift. Accordingly, in the embodiment described above, a result detected in the simple image recognition processing performed at high speed can be effectively used for the detailed image recognition processing performed thereafter.

For example, processing considered to be necessary when a fast subject is a detection target in the image recognition, such as positioning between a subject in a high resolution image and a subject in a low resolution image, is not required. The fact that the processing of positioning between the subjects is no longer required is also effective when realizing a miniaturized image recognition device. More specifically, in the conventional image recognition processing, a low resolution image and a high resolution image are obtained by different imaging (exposure). Accordingly, when detecting a fast subject as a detection target, the state of a subject detected in the simple image recognition processing, which has been performed at high speed using the low resolution image, and the state of a subject detected in the detailed image recognition processing using the high resolution image are different. For this reason, in the conventional image recognition processing, processing such as positioning between the subject in the high resolution image and the subject in the low resolution image is required. In contrast, in the embodiment described above, it is possible to perform respective image recognition processes for subjects of the same timing. Accordingly, even in the case of detecting a fast subject as a detection target, the state of a subject detected in the simple image recognition processing, which has been performed at high speed using a low resolution image, and the state of a subject detected in the detailed image recognition processing using a high resolution image are the same. For this reason, in the embodiment described above, as in a case of detecting a state in which a pet (in FIG. 3, a "dog") shown in an example of the image recognition processing of FIG. 3 faces the front, a result detected in the simple image recognition processing performed at high speed can be used for the detailed image recognition processing performed thereafter. Accordingly, processing such as positioning between a subject in the high resolution image and a subject in the low resolution image, which has been required in the conventional image recognition processing, is not required.

The fact that the high resolution image and the low resolution image are obtained by the same one exposure (imaging) and processing, such as positioning between a subject in the high resolution image and a subject in the low resolution image, is no longer required can also be utilized, for example, in the determination of a so-called wake-up operation of starting all operations of the image recognition device or increasing the frame rate according to the result of the simple image recognition processing using a low resolution image. The use in the determination of the wake-up operation is also effective for the realization of a further reduction in power consumption of the image recognition device. More specifically, for example, in a case where the result of simple image recognition processing using a low resolution image is used in the determination of the wake-up operation in the conventional image recognition processing, it is required again to capture a high resolution image after all operations of the conventional image recognition device are started. For this reason, in the conventional image recognition device, processing after wake-up is performed for the high resolution image that is different from the low resolution image determined to wake up. In contrast, in the embodiment described above, a high resolution image and a low resolution image are obtained by the same exposure (imaging). Therefore, it is possible to perform processing after wake-up for the high resolution image obtained by the same exposure (imaging) as the low resolution image determined to wake up. That is, in the embodiment described above, even in a case where the result of simple image recognition processing using a low resolution image is used in the determination of the wake-up operation or the like, it is possible to perform the same processing as when no wake-up operation is performed.

Thus, in the embodiment described above, it is possible to construct an image recognition device capable of reducing the total processing time, power consumption, and its size while realizing both high-accuracy image recognition and high-speed image recognition. In addition, in the imaging system in which the image recognition device of the embodiment described above is constructed, it is possible to realize an effective system in which both high-accuracy image recognition and high-speed image recognition are realized and in which a speed increase due to the reduction in the total processing time, long-time driving due to the reduction in power consumption, and miniaturization are realized.

In the present embodiment, a configuration is shown in which the pixel signal processing unit 100 provided in the image recognition device 10 includes the second charge storage circuit 104, which stores the signal charge obtained by averaging the amount of signal charges generated by the corresponding photoelectric conversion section 101 provided in each pixel, and the high resolution image S1 and the low resolution image S2 are separately output. However, the configuration of the pixel signal processing unit provided in the image recognition device of the present invention is not limited to the configuration shown above in the embodiment for carrying out the present invention. For example, a configuration can be adopted in which a component, which further averages the signal charges generated by the corresponding pixels stored in the second charge storage circuit 104, is provided in the pixel signal processing unit and an image with a lower resolution than that of the low resolution image S2 is also output from the pixel signal processing unit. In this case, in the image recognition device, it can be considered to divide the process of image recognition into three stages and perform image recognition for narrowing detection candidates in each stage. More specifically, it can be considered that the image recognition processing unit 110 provided in the image recognition device 10 performs image recognition processing at higher speed using an image with a much lower resolution image than the low resolution image S2 in the first (first stage) process of image recognition, performs image recognition processing at high speed using the low resolution image S2 in the next (second stage) process of image recognition, and performs image recognition processing using the high resolution image S1 in the last (third stage) process of image recognition. Therefore, it is thought that oversight of a detection candidate can be limited.

In the present embodiment, a case has been described in which the respective processes in the first image recognition process are performed using a simple method and the respective processes in the second image recognition process are performed using a detailed method, that is, a case has been described in which the method of each process in the first image recognition process is different from the method of each process in the second image recognition process. However, the low resolution image S2 used in the first image recognition process is an image with a lower resolution than that of the high resolution image S1 used in the second image recognition process. That is, the number of pixels included in the low resolution image S2 is smaller than the nunber of pixels included in the high resolution image S1. Accordingly, the method of each process in the first image recognition process and the method of each process in the second image recognition process can be the same method. The reason is as follows. The low resolution image S2 is an image having a smaller number of pixels than the high resolution image S1. Therefore, even in a case where each process in the first image recognition process and each process in the second image recognition process are performed using the same method, it can be considered that the processing load in each process in the first image recognition process is lower than that in each process in the second image recognition process.

In the present embodiment, in the pixel signal processing unit 100 provided in the image recognition device 10, an example of the configuration is shown in which two predetermined pixels are a set. However, the set of pixels in the pixel signal processing unit provided in the image recognition device of the present invention is not limited to the configuration of the embodiment described above. That is, it is also possible to configure one set with a larger nmuber of pixels than in the configuration shown in the embodiment for carrying out the present invention.

In addition, the number of pixels provided in the pixel signal processing unit 100 or the number to reduce the number of pixels is not limited to the embodiment for carrying out the present invention, and the number of pixels provided in the pixel signal processing unit 100 or the number to reduce the number of pixels can be changed in the range without departing from the spirit of the present invention.

In addition, in the present embodiment, there is no limitation on the image recognition device 10 or the structure for arranging the respective components provided in the pixel signal processing unit 100 provided in the image recognition device 10. For example, the pixel signal processing unit 100 may be configured by a charge coupled device (CCD) type solid state imaging device or a complementary metal oxide semiconductor (CMOS) type solid state imaging device that separately outputs the high resolution image S1 and the low resolution image S2 according to pixel signals obtained by photoelectrically converting light incident on each pixel. The solid state imaging device may have a multilayer substrate structure in which the respective components are arranged on a plurality of substrates so as to be divided for the plurality of substrates, or may have a so-called monolithic structure in which all components are arranged on one substrate. For example, a multilayer substrate structure may be adopted in which the respective components of the image recognition device 10 are divided for a plurality of substrates, or all of the components may be formed in a monolithic structure.

While the embodiments of the present invention have been described with reference to the diagrams, the specific configuration is not limited to the embodiments, and various changes may also be included in the range without departing from the spirit of the present invention. The present invention is not limited to the above explanation, and is defined only by the appended claims.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is limited only by the scope of the appended claims.

What is claimed is:

1. An image recognition device, comprising:
a plurality of first charge storage circuits that store signal charges generated by photoelectric conversion sections provided in each of a plurality of pixels arranged in a two-dimensional matrix;
a plurality of second charge storage circuits that store the signal charges generated by the photoelectric conversion sections provided in predetermined pixels of the plurality of pixels;
a first charge read circuit section that reads a pixel signal corresponding to the signal charge stored in each of the first charge storage circuits and outputs an image according to the read pixel signal as a first image;
a second charge read circuit section that reads a pixel signal corresponding to the signal charge stored in each of the second charge storage circuits and outputs an image according to the read pixel signal as a second image having a predetermined reduced number of pixels;
a read circuit selection section that selects one of the first charge read circuit section and the second charge read circuit section as a charge read circuit section that reads an image;
an image reading section that reads an image from the charge read circuit section selected by the read circuit selection section; and
a feature amount determination section that calculates a feature amount of a subject included in the image read by the image reading section and determines a detection target subject according to the calculated feature amount,
wherein the feature amount determination section determines the detection target subject according to a feature amount of each subject included in the second image read from the selected second charge read circuit section at first, and whether to select the first charge read circuit section and perform the determination for a subject included in the first image read from the selected first charge read circuit section is determined based on the determination result,
wherein the feature amount determination section includes
a feature amount calculation section that calculates the feature amount of each subject included in the image read by the image reading section,
a classifier applying section that inputs the feature amount calculated by the feature amount calculation section to a classifier prepared in advance and outputs a classification score indicating a detection target subject likeliness, and
a detection determination section that determines whether or not a subject expressed by the feature amount calculated by the feature amount calculation section is the detection target subject according to the classification score calculated by the classifier applying section, and
wherein the feature amount calculation section calculates the feature amount of each subject, which is included in the second image read first by the image reading section, and the feature amount of each subject, which is included in the first image read next by the image reading section, using different calculation methods, and
the classifier applying section inputs the feature amount calculated for the second image and the feature amount calculated for the first image to different classifiers prepared in advance.

2. The image recognition device according to claim 1, wherein the second charge storage circuits store signal charges corresponding to an amount of charges obtained by averaging the signal charges generated in the same exposure period by the photoelectric conversion sections in the plurality of corresponding pixels, and
the second image output from the second charge read circuit section is an image according to a pixel signal corresponding to the signal charges obtained by the same exposure as in the first image output from the first charge read circuit section, with a lower resolution than that of the first image.

3. The image recognition device according to claim 1, further comprising:
a partial image setting section that sets partial images by dividing a region of the image read by the image reading section into at least one region,
wherein the feature amount determination section determines whether or not a subject included in each of the partial images is the detection target subject for each of the partial images set by the partial image setting section.

4. The image recognition device according to claim 3, wherein the partial image setting section sets a plurality of partial images by dividing a region of the second image read first by the image reading section.

5. The image recognition device according to any one of claims 1, further comprising:
an image range setting section that sets a range of the image read by the image reading section,
wherein the image range setting section sets a range of the first image, which is to be read next by the image reading section, again according to a determination result regarding the detection target subject, which is obtained by determination of the feature amount determination section for the second image, and
the image reading section reads the first image within the image range set again by the image range setting section when reading the first image next.

6. The image recognition device according to claim 5, wherein, when the image reading section reads the second image first, the image range setting section sets an entire range of the second image to be read as a range of the image read by the image reading section.

7. An image recognition method, comprising:
a first charge storage step of storing signal charges, which are generated by photoelectric conversion sections provided in a plurality of pixels arranged in a two-dimensional matrix, in a plurality of first charge storage circuits;

a second charge storage step of storing the signal charges, which are generated by the photoelectric conversion sections provided in predetermined pixels of the plurality of pixels, in a plurality of second charge storage circuits;

a first charge read step of causing a first charge read circuit section to read a pixel signal corresponding to the signal charge stored in each of the first charge storage circuits and output an image according to the read pixel signal as a first image;

a second charge read step of causing a second charge read circuit section to read a pixel signal corresponding to the signal charge stored in each of the second charge storage circuits and output an image according to the read pixel signal as a second image having a predetermined reduced number of pixels;

a read circuit selection step of causing a read circuit selection section to select either the first charge read circuit section or the second charge read circuit section as a charge read circuit section that reads an image;

an image reading step of causing an image reading section to read an image from the charge read circuit section selected in the read circuit selection step; and a feature amount determination step of causing a feature amount determination section to calculate a feature amount of each subject included in the image read in the image reading step and determine a detection target subject according to the calculated feature amount, wherein whether to select the first charge read circuit section in a second process and perform the determination for a subject included in the first image is determined by a determination result obtained by selecting the second charge read circuit section in a first process and determining the detection target subject according to a feature amount of each subject included in the second image read by the selected second charge read circuit section, wherein the feature amount determination step includes
a feature amount calculation step of calculating the feature amount of each subject included in the image read by the image reading step,
a classifier applying step of inputting the feature amount calculated by the feature amount calculation step to a classifier prepared in advance and outputting a classification score indicating a detection target subject likeliness, and
a detection determination step of determining whether or not a subject expressed by the feature amount calculated by the feature amount calculation step is the detection target subject according to the classification score calculated by the classifier applying step, and wherein the feature amount calculation step calculates the feature amount of each subject, which is included in the second image read first by the image reading step, and the feature amount of each subject, which is included in the first image read next by the image reading step, using different calculation methods, and the classifier applying step inputs the feature amount calculated for the second image and the feature amount calculated for the first image to different classifiers prepared in advance.

* * * * *